US010174776B2

(12) United States Patent
Rayos

(10) Patent No.: US 10,174,776 B2
(45) Date of Patent: Jan. 8, 2019

(54) MODULAR RAIL SYSTEM

(71) Applicant: RayoMar Enterprises, Inc., Sterling Heights, MI (US)

(72) Inventor: Richard C. Rayos, Warren, MI (US)

(73) Assignee: RAYOMAR ENTERPRISES, INC, Sterling Heights, MI (US)

( * ) Notice: Subject to any disclaimer, the term of this patent is extended or adjusted under 35 U.S.C. 154(b) by 470 days.

(21) Appl. No.: 14/713,815

(22) Filed: May 15, 2015

(65) Prior Publication Data

US 2015/0260209 A1 Sep. 17, 2015

Related U.S. Application Data

(63) Continuation-in-part of application No. 13/717,159, filed on Dec. 17, 2012, now Pat. No. 9,032,593, (Continued)

(51) Int. Cl.
*F16B 5/06* (2006.01)
*F16B 7/04* (2006.01)

(52) U.S. Cl.
CPC .......... *F16B 5/0635* (2013.01); *F16B 5/0664* (2013.01); *F16B 7/0473* (2013.01); (Continued)

(58) Field of Classification Search
CPC ...... F16B 5/0635; F16B 5/0664; F16B 7/042; F16B 7/0426; F16B 7/0473; F16B 7/048; (Continued)

(56) References Cited

U.S. PATENT DOCUMENTS 3,426,412 A * 2/1969 Streng ..................... B44C 7/022
24/461
6,543,957 B1 * 4/2003 Raspotnig .............. H02B 1/052
403/286
(Continued)

FOREIGN PATENT DOCUMENTS

DE 2428518 A1 * 12/1975 ............ F16B 5/0664
DE 20007435 U1 * 6/2000 ............ F16B 5/0064
(Continued)

OTHER PUBLICATIONS

International Search Report for PCT/US2016/032709 dated Aug. 2, 2016; 4 pages.

*Primary Examiner* — Josh Skroupa
(74) *Attorney, Agent, or Firm* — Panagos Law Group; Bill C Panagos; Daniel J. Checkowsky

(57) ABSTRACT

A rail system includes a first rail unit with a hook portion forming a recessed cavity with an opening. A resilient strip or cord is located within the recessed cavity and is at least partially exposed through the opening. A cam portion positioned apart from the hook portion has a detent and a recessed portion. A second rail unit, releasably fastenable to the first rail unit, has a first flange section insertable into the hook portion of the first rail unit to compress the strip or cord and a second flange section snappable into the recessed portion of the cam portion of the first rail unit. The first flange extends through the opening of the recessed cavity and an end surface of the first flange engages the strip or cord when the second rail unit is fastened to the first rail unit.

20 Claims, 7 Drawing Sheets

Related U.S. Application Data which is a continuation-in-part of application No. 12/783,258, filed on May 19, 2010, now Pat. No. 8,341,810.

(60) Provisional application No. 61/248,561, filed on Oct. 5, 2009.

(52) U.S. Cl.
CPC ....... *F16B 2200/10* (2018.08); *Y10T 24/4406* (2015.01); *Y10T 403/7043* (2015.01)

(58) Field of Classification Search
CPC ........ F16B 7/0486; F16B 12/26; F16B 12/38; Y10T 24/4406; Y10T 403/32254; Y10T 403/55; Y10T 403/5793; Y10T 403/60; Y10T 403/608; Y10T 403/64; Y10T 403/7039; Y10T 403/7043; Y10T 403/7061
USPC ......... 403/83, 292, 314, 326, 330, 335, 361, 403/363, 372, DIG. 11; 24/462
See application file for complete search history.

(56) References Cited

U.S. PATENT DOCUMENTS

| | | | |
|---|---|---|---|
| 9,273,708 B2 * | 3/2016 | Urban | F16B 7/187 |
| 2006/0251469 A1 * | 11/2006 | McBride | A01K 81/04 403/100 |
| 2010/0216334 A1 * | 8/2010 | Christmann | H02B 1/052 439/532 |
| 2011/0078880 A1 | 4/2011 | Rayos | |
| 2013/0108360 A1 | 5/2013 | Rayos | |

FOREIGN PATENT DOCUMENTS

| | | | | |
|---|---|---|---|---|
| DE | 102005024061 A1 * | 11/2006 | ............ | F16B 5/0635 |
| DE | 102005060585 * | 6/2007 | ............ | H01R 13/60 |
| FR | 2163787 A5 * | 7/1973 | ............ | A47B 47/04 |
| FR | 3010427 A1 * | 3/2015 | ......... | G09F 15/0018 |
| WO | WO-2005024251 A1 | 3/2005 | | |

* cited by examiner

MODULAR RAIL SYSTEM

CROSS-REFERENCE TO RELATED APPLICATIONS

This application is a continuation-in-part of U.S. patent application Ser. No. 13/717,159 filed on Dec. 17, 2012, now U.S. Pat. No. 9,032,593, which is a continuation-in-part of U.S. patent application Ser. No. 12/783,258 filed on May 19, 2010, now U.S. Pat. No. 8,341,810, which claims the benefit of U.S. Provisional Application No. 61/248,561 filed on Oct. 5, 2009, all of which are hereby incorporated by reference in their entireties.

BACKGROUND

Modular rail systems have many applications, from heavy duty industrial applications such as construction to light duty applications such as building toys for creating various constructs limited only by the imagination of a child.

How the rail units connect with one another, how quickly they fasten and unfasten, and how securely they fasten to one another distinguish light duty from heavy duty modular rail systems. It may be desirable to have a fastening apparatus for a modular rail system that can be scaled up or scaled down, depending upon the application. A modular rail system with an improved fastening apparatus may minimize the number of parts and the time required for connecting rail units. Such a modular rail system may permit fast, snap-action releasable connections that are reliable and secure.

BRIEF DESCRIPTION OF THE DRAWINGS

Features and advantages may become more apparent from the following detailed description of exemplary embodiments taken in conjunction with the accompanying drawings, described in brief below.

DETAILED DESCRIPTION

Exemplary, non-limiting embodiments of rail systems and rail units are disclosed herein, as are associated methods.

Figure 1:
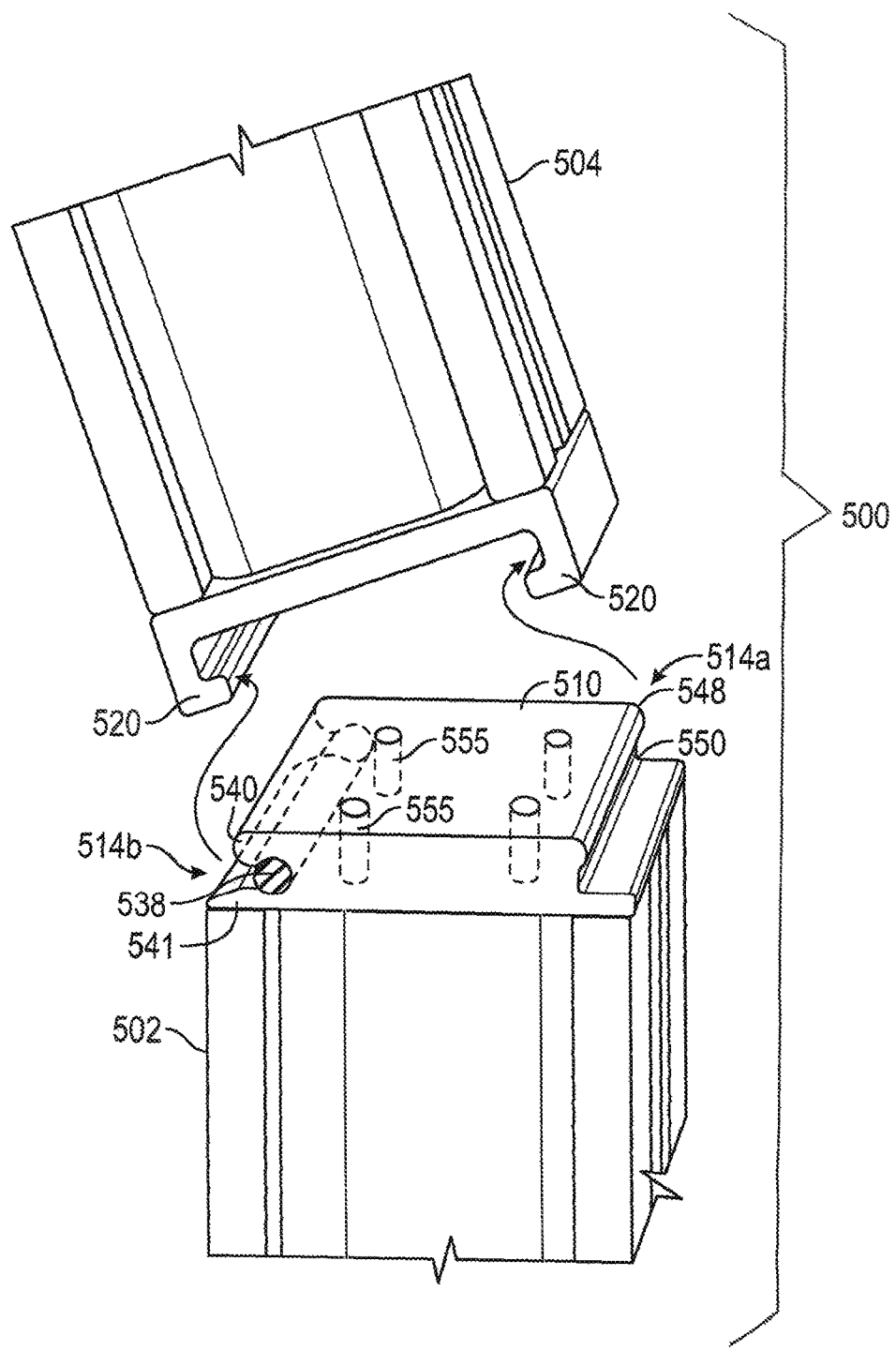
FIG. 1 is an exemplary rail system having an end-to-end connection.

FIG. 1 shows an exemplary rail system 500 having at least rail unit 502, which is removably engagable with a rail unit 504. "Rail" units, as used herein, may have any of a number of shapes, non-limiting examples of which are illustrated in FIGS. 1-6. Typical general shapes may include substantially cylindrical rails or substantially rectangular prism rails. Rails may be hollow or solid, or include internal structures such as ribs and channels of various shapes and sizes.

Rail units may be made from any of a number of rigid materials. Stronger materials may be used in heavier duty applications, while softer or less expensive materials may be used in lighter duty applications. Exemplary materials may include but are not limited to metals, composite materials, and plastics, optionally with additives. Metals may include any of a number of steel alloys, aluminum alloys, including anodized aluminum. Composite materials may include polymer-based substrates in matrices with resin(s). Plastics may include thermoplastics and thermosetting plastics. Additives may include reinforcing additives such as, by way of non limiting examples, ceramics such as glass fibers, carbon fibers, biofibers, aramid fibers, nano particles, and others. Other additives are contemplated, and may include fillers, impact modifiers, anti-tack agents. Rail units may be made or formed by any of a number of manufacturing processes, including extrusion, injection molding, stamping, roll-forming, investment casting, and other methods. Coatings may optionally be applied to one or more surfaces of a rail unit. Coatings may include protective coatings, wear-resistance coatings, coatings to reduce or increase a coefficient of friction, anti-corrosive coatings, water-resistant coatings, UV-resistant coatings, platings, conductive coatings, and insulative coatings.

In FIG. 1, a rail unit 502 is shown with a fastening apparatus 510 having a cam portion 514a and a hook portion 514b. Fastening apparatus 510 can be integral with rail unit 502, or fastened to rail unit 502 with adhesives and/or mechanical fasteners 555. Thus, a body of fastening apparatus 510 can be of the same or different materials than the rail unit 502. In some exemplary embodiments, the body of fastening apparatus 510 can be formed together with rail unit 502.

The exemplified cam portion 514a includes a detent 548 and a recessed or convex portion 550. The exemplified hook portion 514b includes resilient element 538, which resides at least partially in a recess, cavity or channel. The channel is flanked by protrusions 540 and 541, and an opening exists between the protrusions 540 and 541 for access to the resilient element 538. The shapes of protrusions 540 and 541 define the size of the opening and ease of access for incoming structure to compress resilient element 538.

Rail unit 504 has structural sections that releasably engage with the fastening apparatus 510. In the depicted exemplary embodiment, the structural sections are first and second flanges 520. The rail units 502 and 504 are releasably engageable when a first flange 520 is pushed against resilient element 538 to compress same, and a second flange 520 is then snapped into convex portion 550.

Resilient element 538 has properties that are spring-like, but advantageously, it does not include moving parts as does, for example, a traditional coil spring. Rather, without being bound by theory, resilient element 538 operates in the rail system 500 generally according to hydraulics principles. Rail units 502 and 504 remain rigid—they do not bend during acts of securing or releasing—while the resilient element 538 is compressed and decompresses. The resilient element 538 is made from materials having resiliency properties. Thus, when compressed, resilient element 538 is bias toward adopting its original shape. After the snap action securement of the second flange 520 into position, previously compressed resilient element decompresses to return toward its original shape. More stiff resilient elements may be used where a more secure fit is required and significant force is required snap rail units together and take them apart. Less stiff resilient elements may be used where less force is required for such actions.

The resilient element 538 may be made from any number of resilient materials, including but not limited to any of various polymers or natural or synthetic rubbers including silicone rubber or polyurethane. Shape-memory metal alloys and shape-memory polymers may also be suited for use in the composition of resilient element 538. Resilient element 538 may be strips, cord, or rods. Strips, cords and rods, of course, are not limited to particular shapes or dimensions. For example, referring to FIG. 7, a variety of shapes of exemplary resilient elements 538 are shown by cross-section.

Figure 2:
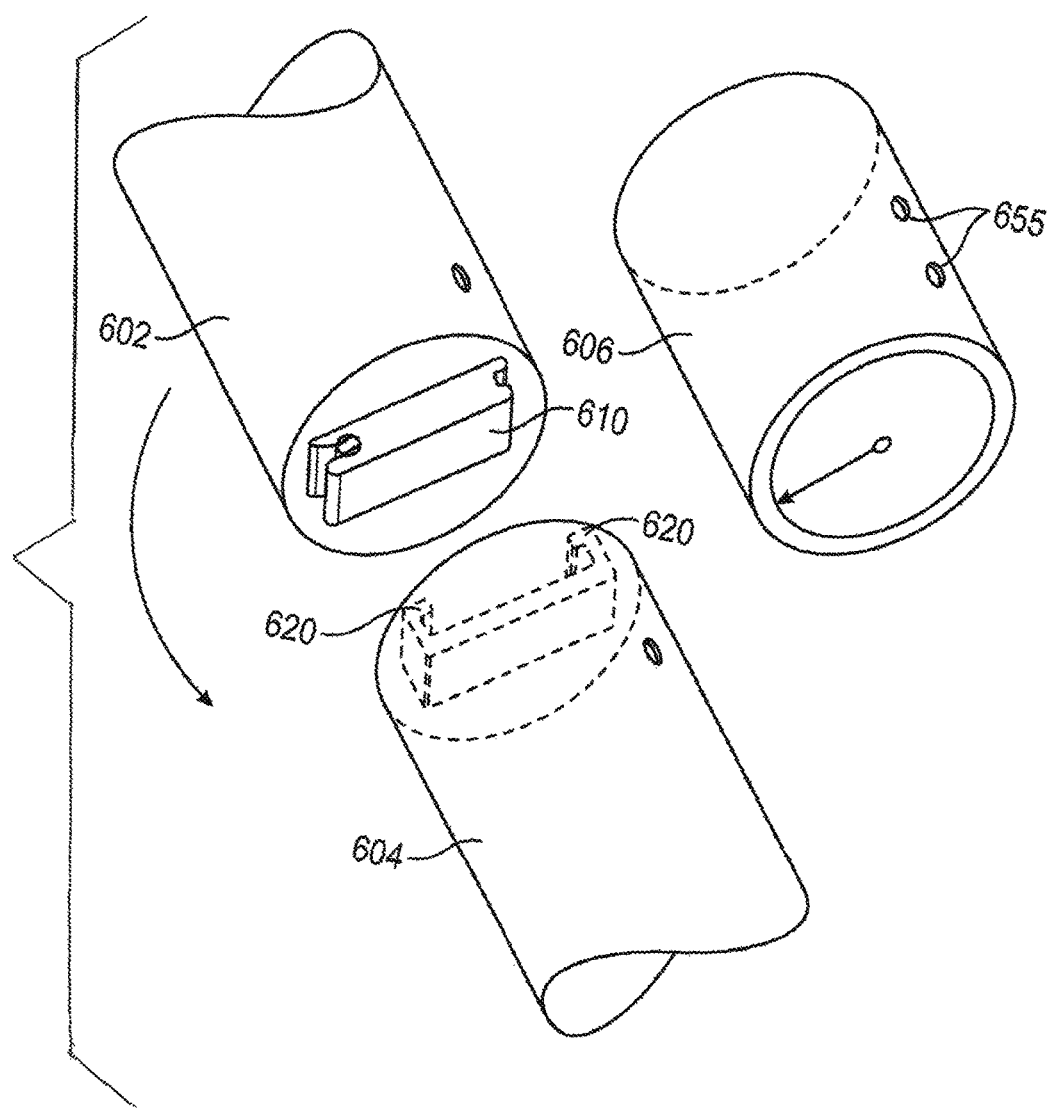
FIG. 2 is an exemplary rail system having a locking collar over an end-to-end connection.

FIG. 2 shows an exemplary end-to-end connection between two rail units 602 and 604, reinforced with support sleeve 606. In the example of FIG. 2, the rail units 602 and 604 are substantially cylindrical in shape, and support sleeve 606 is a hollow tube with in inner diameter just large enough to slide over an outer diameter of the rail units 602 and 604, and then be secured in place by any a number of mechanisms including but not limited to pins, screws, bolts or other structures through one or more apertures 655 with receiving structure in or on the rail units 602 and 604. Support sleeve 606 can provide mechanical strength to minimize bending of connected rail units 602 and 604 at or near the joint where fastening apparatus 610 is engaged with flanges 620. Support sleeve 606 may also provide stabilization between rail units. Support sleeves 606 can be used with cylindrical rail units or with rail units of other general shapes such as rectangular prisms, so long as its shape is complementary to the rail unit.

Figure 3:
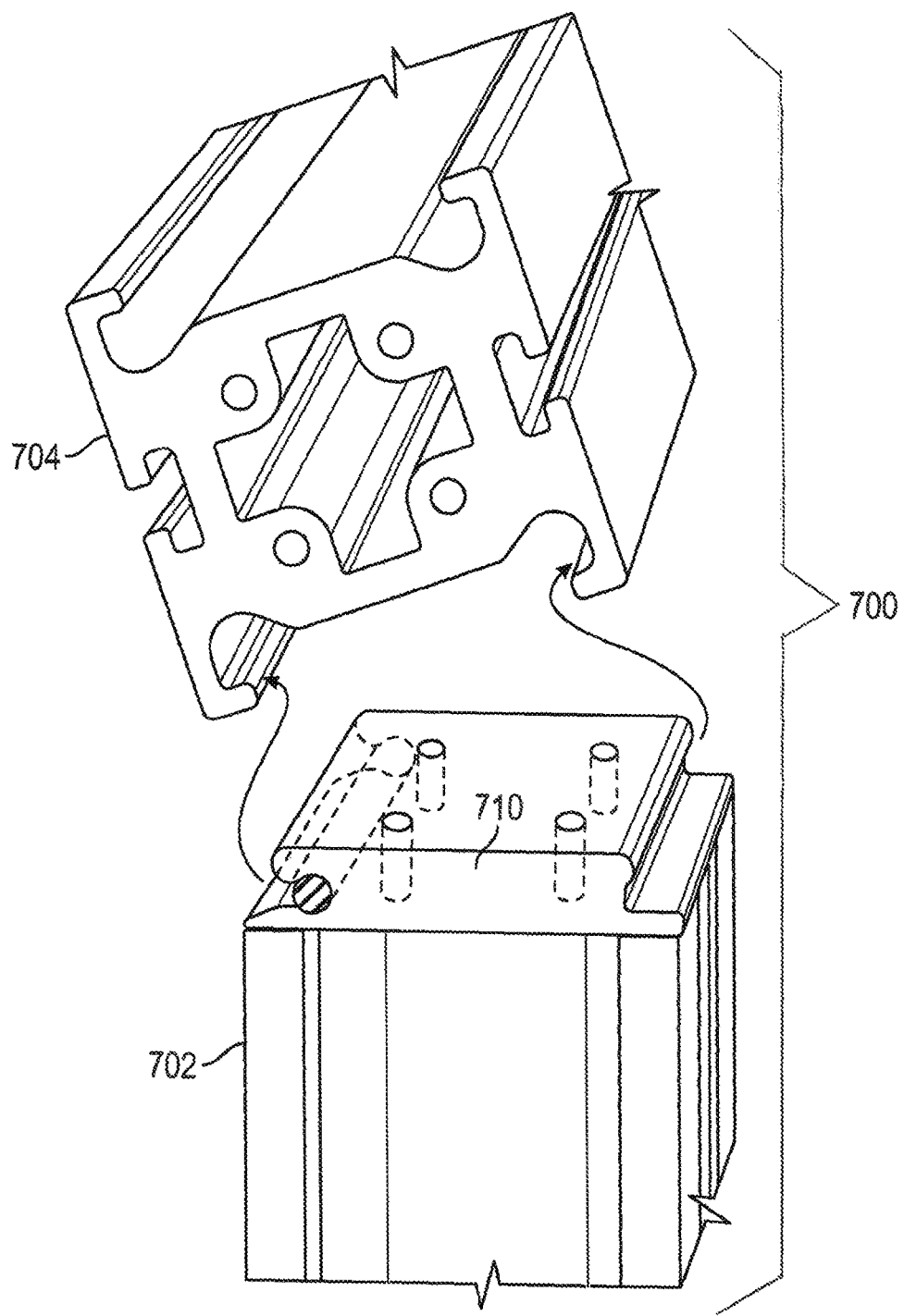
FIG. 3 is an exemplary rail system having and end-to-side connection.
Figure 4:
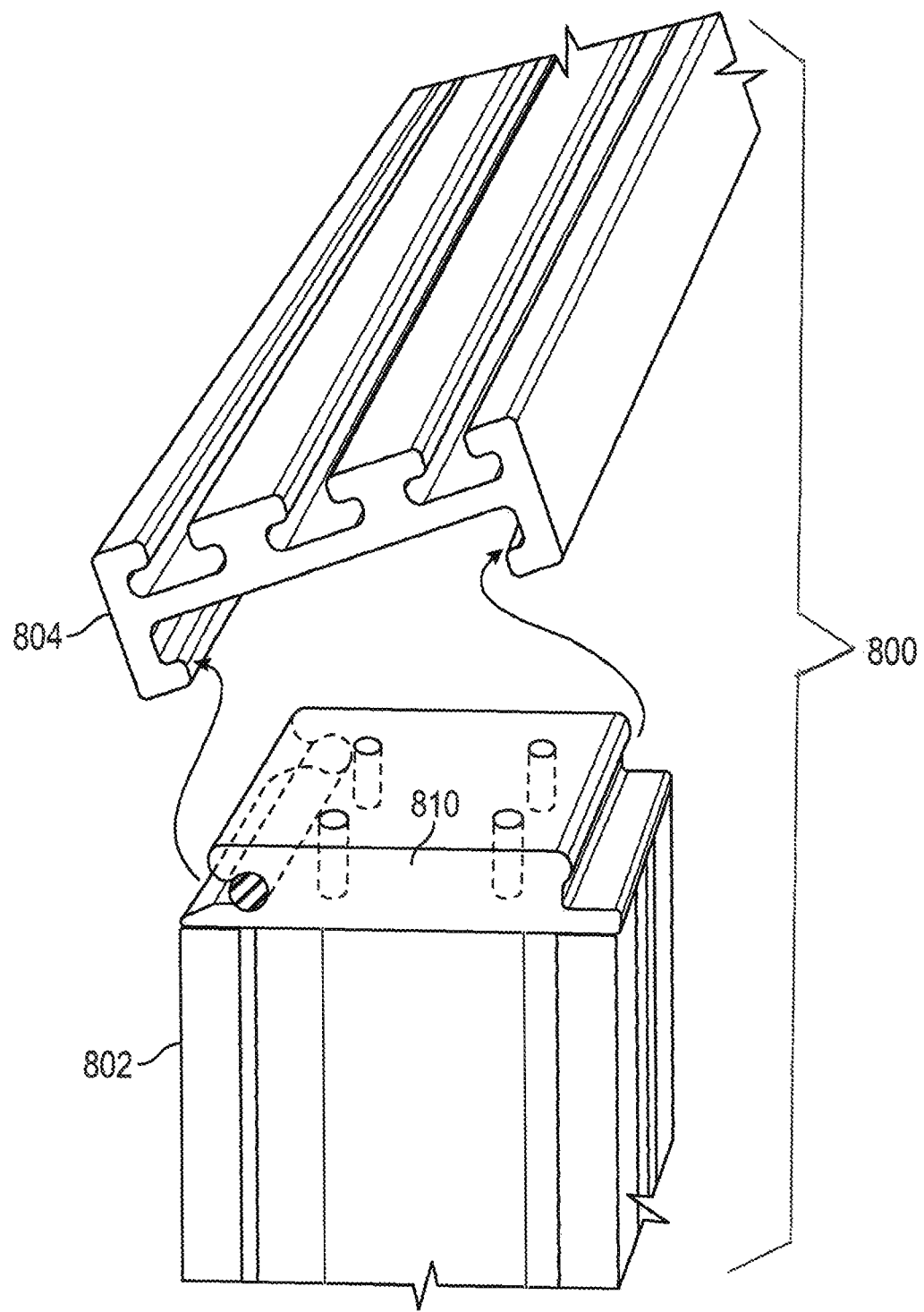
FIG. 4 is an exemplary rail system having and end-to-side connection.
Figure 5:
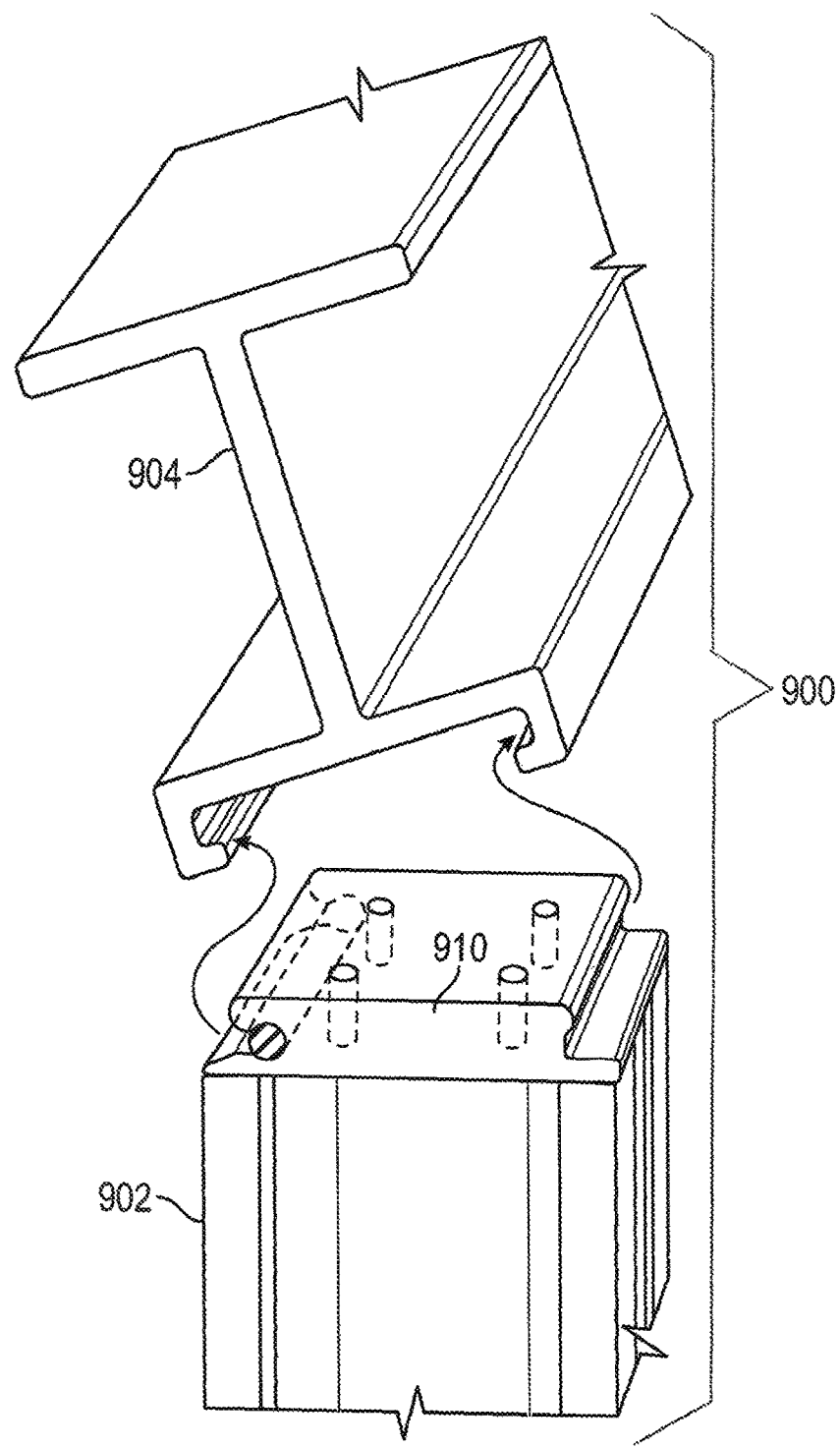
FIG. 5 is an exemplary rail system having and end-to-side connection.
Figure 6:
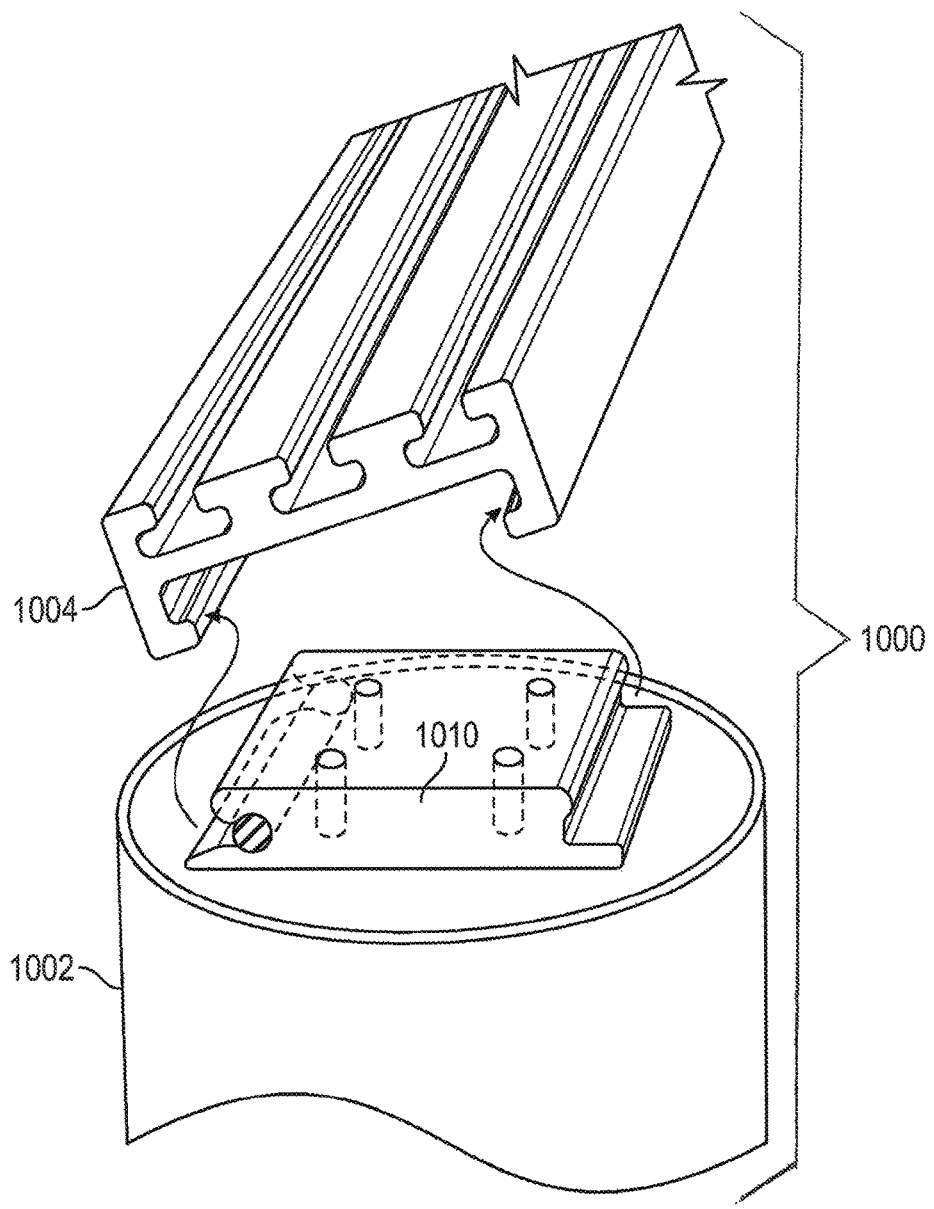
FIG. 6 is an exemplary rail system having and end-to-side connection.

FIG. 3 shows an exemplary rail system 700 with rail units 702 and 704 being connected in an end-to-side configuration via fastening apparatus 710. FIG. 4 shows an exemplary rail system 800 with rail units 802 and 804 being connected in an end-to-side configuration via fastening apparatus 810. FIG. 5 shows an exemplary rail system 900 with rail units 902 and 904 being connected in an end-to-side configuration via fastening apparatus 910. FIG. 6 shows an exemplary rail system 1000 with rail units 1002 and 1004 being connected in an end-to-side configuration via fastening apparatus 1010. Generally, a rail unit has a surface with a hook portion and a cam portion, or a rail unit has a surface with structural sections for releasably engaging with hook portions and cam portions of other rail units. A rail unit may have one surface with a hook portion and a cam portion, and another surface with structural sections such as flanges for releasable engagement with other rail units.

Figure 7A:
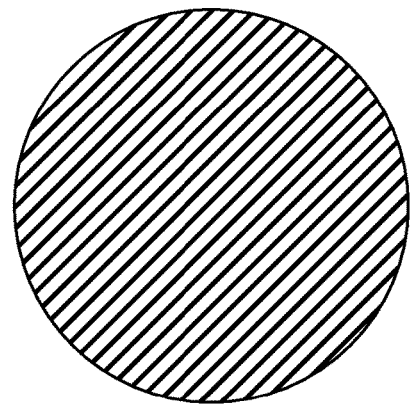
FIG. 7A shows a cross-section of an exemplary resilient element for use with rail systems.
Figure 7B:
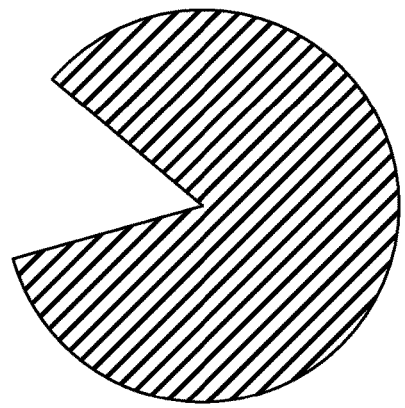
FIG. 7B shows a cross-section of an exemplary resilient element for use with rail systems.
Figure 7C:
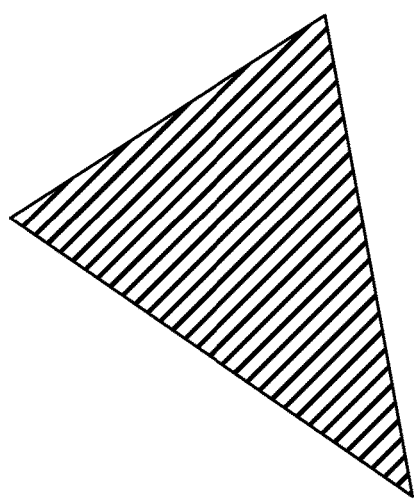
FIG. 7C shows a cross-section of an exemplary resilient element for use with rail systems.
Figure 7D:
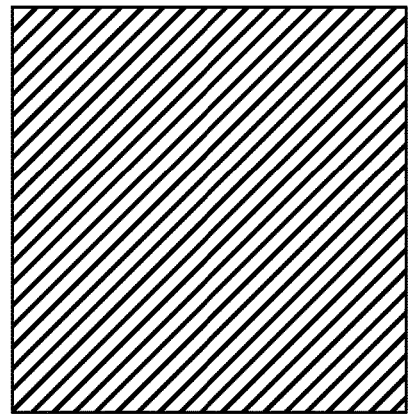
FIG. 7D shows a cross-section of an exemplary resilient element for use with rail systems.

FIGS. 7A-7D show cross-sections of exemplary resilient elements for use in the disclosed rail systems. The cross section illustrated in FIG. 7A is substantially circular, the cross section illustrated in FIG. 7B is a sector, or a circle with a "pie wedge" shape missing, the cross section illustrated in FIG. 7C is triangular, and the cross section illustrated in FIG. 7D is rectangular. Many shapes and sizes of resilient elements are contemplated for use with the fastening apparatus disclosed herein; the figures are merely illustrative. For example, a square cross section is contemplated, as are ovals. The use of a particular shape may permit tuning the amount of force needed for release or engagement in particular applications.

Rail systems are not limited by numbers of rail units in a system or whether particular connections are end-to-end, end-to-side, side-to-side or a combination of some or all such connections. Some rail units may be shaped to have only one connection point, others may be shaped to have several. Some rail units may have both a fastening apparatus on a surface of one end or side, and flanged portions on or in a surface of another end or side. The releasable connections made by the fastening apparatus are secure and reliable, and can be suitable for maintaining electrical connections in applications when securing one conductive surface against another.

Applications for the disclosed rail systems are numerous. A collection of rail units could, for example, make up a toy building system. Such a system may comprise a plurality of rail units of different sizes, shapes and colors being removably attachable with a series snap-action fastening apparatuses. When made from heavier duty materials, the disclosed rail system has larger scale applications. For example, the disclosed rail system is faster and easier to break down and put together than traditional assemblies requiring tools and mechanical fasteners like nuts, bolts, screws and the like. With the snap-action fastening apparatus of the disclosed rail system, few if any tools and mechanical fasteners may be necessary in the set up or break down. On still a larger scale, a rail system that supports construction elements like drywall and windows for commercial buildings.

Regardless of scale, the snap-action fastening apparatus (examples of which are illustrated as 510, 610, 710, 810, 910 and 1010), provides a high holding force relative to the ease of snapping to create or release a connection with the apparatus. The high holding force is such that there is little or discernible movement or slop between connected objects. Also advantageously, objects connected with the snap-action fastening apparatus do not compare apart accidentally or via random external forces. Intentional application of force to snap on or snap off is the way to create and release the connections.

While the rail systems and fastening apparatuses have been described in reference to some exemplary embodiments, these embodiments are not limiting and are not necessarily exclusive of each other, and it is contemplated that particular features of various embodiments may be omitted or combined for use with features of other embodiments while remaining within the scope of the invention. The apparatuses may be scaled up or down for use in applications not expressly disclosed or referenced herein, and the materials may be selected for certain properties such as conductivity, insulative properties, rigidity and the like.

What is claimed is:

1. A rail system, comprising:
  a first rail unit including a hook portion comprising a recessed cavity having an opening, a rim of the opening at least partially defined by a first protrusion and a second protrusion located opposite the first protrusion, a resilient strip or cord disposed within the recessed cavity, the strip or cord being at least partially exposed through the opening in the cavity, and a cam portion positioned apart from the hook portion, the cam portion having a detent and a recessed portion, the hook portion and the cam portion being directly or indirectly structurally connected and configured to be releasably fastenable by resiliency of the strip or cord following compression, the strip or cord located between the rim of the opening and the cam portion; and
  a second rail unit releasably fastenable to the first rail unit, the second rail unit having a first flange insertable through the rim of the opening and into the hook portion of the first rail unit to compress the strip or cord and a second flange insertable into the recessed portion of the cam portion of the first rail unit, the first flange including a first side, a second side opposite the first side and an end surface extending between the first and second sides, the end surface located between the first and second sides and the second flange, the first and second sides extending through the rim of the opening into the recessed cavity and the end surface engaging the strip or cord of the first rail unit when the second flange of the second rail unit is inserted into the recessed portion of the cam portion of the first rail unit.

2. The rail system of claim 1 wherein the first rail unit has a third flange for engaging with a hook portion of another rail unit and a fourth flange for engaging with a cam portion of the other rail unit.

3. The rail system of claim 1 wherein the resilient strip or cord comprises at least one of a natural or synthetic polymer.

4. The rail system of claim 1 wherein the resilient strip or cord has a cross sectional shape selected from the group consisting of a circle, a sector, a triangle and a rectangle.

5. The rail system of claim 1 wherein at least one of the first and second rail units has a substantially cylindrical shape.

6. The rail system of claim 1 further comprising a support sleeve fastenable over a joint between the first and second rail units.

7. The rail system of claim 1 wherein at least one of the first and second rail units has a substantially rectangular prism shape.

8. The rail system of claim 1, wherein the at least one of the first and second rail units comprises plastic.

9. The rail system of claim 1, wherein at least one of the first and second rail units comprises at least one of metal and reinforced plastic.

10. The rail system of claim 1, wherein the resilient strip or cord contacts the first and second protrusions.

11. The rail system of claim 1, wherein the resilient strip or cord is disposed entirely within the recessed cavity.

12. A rail unit, comprising:
a rail;
a fastening apparatus on a surface of the rail, the fastening apparatus including a hook portion comprising a recessed cavity having an opening, a rim of the opening at least partially defined by a first protrusion and a second protrusion spaced from and located opposite the first protrusion, a resilient strip or cord disposed entirely within the recessed cavity, the strip or cord being at least partially exposed through the opening in the cavity; and
a cam portion positioned apart from the hook portion, the cam portion having a detent and a recessed portion, the hook portion and the cam portion being directly or indirectly structurally connected and configured to be releasably fastenable by resiliency of the strip or cord following compression, the strip or cord located between the rim of the opening and the cam portion.

13. The rail unit of claim 12, wherein the rail has a substantially rectangular prism shape.

14. The rail unit of claim 12, wherein the rail has a substantially cylindrical shape.

15. The rail unit of claim 12 further including a plurality of flanges connectable to other rail units equipped with a fastening apparatus.

16. The rail unit of claim 12, wherein at least one of the rail and the fastening apparatus comprises metal or plastic or composite material.

17. The rail unit of claim 12 wherein the strip or cord has a cross sectional shape of a circle, sector, rectangle, square or triangle.

18. The rail unit of claim 12, wherein the resilient strip or cord contacts the first and second protrusions.

19. The rail unit of claim 12, wherein the hook portion is engageable with a flange on a surface of a second rail unit, the first protrusion engageable with a first side of the flange, the second protrusion engageable with a second side of the flange and the resilient strip or cord engageable with an end surface of the flange extending between the first and second sides.

20. The rail unit of claim 19, wherein the first side of the flange is positioned adjacent the first protrusion and the second side of the flange is positioned adjacent the second protrusion when the flange is engaged with the hook portion.

* * * * *